United States Patent
Stern et al.

(10) Patent No.: US 10,080,057 B2
(45) Date of Patent: *Sep. 18, 2018

(54) SYSTEM AND METHOD FOR PROVIDING PROGRAM-RELATED CONTENT IN A MULTI-SERVICES DISTRIBUTION SYSTEM

(71) Applicant: Time Warner Cable Enterprises LLC, New York, NY (US)

(72) Inventors: Peter Stern, Riverside, CT (US); Joan Gillman, Westport, CT (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,101

(22) Filed: Apr. 24, 2017

(65) Prior Publication Data
US 2017/0230717 A1 Aug. 10, 2017

Related U.S. Application Data

(63) Continuation of application No. 11/756,868, filed on Jun. 1, 2007, now Pat. No. 9,699,415.

(51) Int. Cl.
*H04N 21/43* (2011.01)
*H04N 21/478* (2011.01)
(Continued)

(52) U.S. Cl.
CPC ......... *H04N 21/478* (2013.01); *H04N 21/234* (2013.01); *H04N 21/23424* (2013.01); *H04N 21/25435* (2013.01); *H04N 21/262* (2013.01); *H04N 21/43* (2013.01); *H04N 21/431* (2013.01); *H04N 21/44204* (2013.01); *H04N 21/84* (2013.01)

(58) Field of Classification Search
CPC .. H04N 21/43; H04N 21/431; H04N 21/4316; H04N 21/237; H04N 21/25435; H04N 21/262; H04N 21/234; H04N 21/478; H04N 21/23424
See application file for complete search history.

(56) References Cited

U.S. PATENT DOCUMENTS

| 5,761,606 A | 6/1998 | Wolzien |
| 6,701,526 B1 | 3/2004 | Trovato |

(Continued)

OTHER PUBLICATIONS

"Introduction to Service Provider Video Service Technologies, Architectures and Standards," 2006, Cisco Systems, Inc., (pp. 1-65).

(Continued)

*Primary Examiner* — Robert J Hance
(74) *Attorney, Agent, or Firm* — The Marbury Law Group, PLLC

(57) ABSTRACT

In an embodiment of the present invention, programming content and program-rated content (PRC) cues are delivered to a subscriber via an interactive multi-service distribution network. The PRC cues comprise interactive visual elements that may be used to create a PRC object that is selectable by a subscriber. Upon selection of a PRC object, the subscriber receives PRC through a communication service separate from the video programming delivery service, VOD service, PVR service, and NDVR service.

8 Claims, 4 Drawing Sheets

(51) Int. Cl.
*H04N 21/442* (2011.01)
*H04N 21/84* (2011.01)
*H04N 21/234* (2011.01)
*H04N 21/2543* (2011.01)
*H04N 21/431* (2011.01)
*H04N 21/262* (2011.01)

(56) References Cited

U.S. PATENT DOCUMENTS

| | | | |
|---|---|---|---|
| 7,111,314 B2 | 9/2006 | Urdang et al. | |
| 7,269,842 B1* | 9/2007 | Estipona | H04N 7/162 348/E7.06 |
| 7,930,624 B2* | 4/2011 | Phillips | G11B 27/034 715/201 |
| 9,350,780 B2* | 5/2016 | Good | H04N 19/40 |
| 2002/0059590 A1 | 5/2002 | Kitsukawa et al. | |
| 2002/0104090 A1 | 8/2002 | Stettner | |
| 2002/0124252 A1 | 9/2002 | Schaefer et al. | |
| 2002/0162120 A1 | 10/2002 | Mitchell | |
| 2002/0169700 A1 | 11/2002 | Huffman et al. | |
| 2003/0023970 A1* | 1/2003 | Panabaker | H04N 7/165 725/32 |
| 2003/0051252 A1* | 3/2003 | Miyaoku | H04N 7/17318 725/109 |
| 2003/0110513 A1 | 6/2003 | Plourde, Jr. et al. | |
| 2003/0208767 A1 | 11/2003 | Williamson et al. | |
| 2003/0221191 A1* | 11/2003 | Khusheim | H04N 7/173 725/35 |
| 2003/0229900 A1 | 12/2003 | Reisman | |
| 2004/0261130 A1* | 12/2004 | Leak | H04N 7/163 725/136 |
| 2005/0015816 A1 | 1/2005 | Christofalo et al. | |
| 2005/0076389 A1 | 4/2005 | Lee | |
| 2005/0125831 A1 | 6/2005 | Blanchard | |
| 2005/0223408 A1 | 10/2005 | Langseth et al. | |
| 2007/0107016 A1 | 5/2007 | Angel et al. | |
| 2007/0180461 A1 | 8/2007 | Hilton | |
| 2007/0256015 A1 | 11/2007 | Matz | |
| 2008/0216107 A1 | 9/2008 | Downey et al. | |
| 2009/0217318 A1 | 8/2009 | Versteeg et al. | |
| 2010/0095323 A1 | 4/2010 | Williamson et al. | |
| 2010/0107194 A1 | 4/2010 | McKissick et al. | |
| 2010/0172625 A1 | 7/2010 | Lee et al. | |
| 2010/0245681 A1 | 9/2010 | Harris | |
| 2011/0202953 A1 | 8/2011 | Johnson et al. | |

OTHER PUBLICATIONS

Response to Office Action filed Sep. 22, 2010 in U.S. Appl. No. 11/955,758, filed Dec. 13, 2007.
Final Office Action dated Dec. 10, 2010 in U.S. Appl. No. 11/955,758, filed Dec. 13, 2007.
List of References cited by the Examiner Dec. 10, 2010 in U.S. Appl. No. 11/955,758, filed Dec. 13, 2007.
IDS filed Mar. 10, 2011 in U.S. Appl. No. 11/955.758, filed Dec. 13, 2007.
Examiner's Interview Summary dated Apr. 15, 2011 in U.S. Appl. No. 11/955,758, filed Dec. 13, 2007.
Response to Office Action filed Apr. 27, 2011 in U.S. Appl. No. 11/955,758, filed Dec. 13, 2007.
Non-Final Office Action dated Sep. 14, 2012 in U.S. Appl. No. 11/955,758, filed Dec. 13, 2007.
List of References cited by the Examiner Sep. 14, 2012 in U.S. Appl. No. 11/955,755, filed Dec. 13, 2007.
Office Action Response filed Oct. 17, 2012 in U.S. Appl. No. 11/955,758, filed Dec. 13, 2007.
Final Office Action dated Aug. 27, 2010 in U.S. Appl. No. 12/027,698, filed Feb. 7, 2008.
Final Office Action Response filed Nov. 17, 2010 in U.S. Appl. No. 12/027,698, filed Feb. 7, 2008.
Examiners Interview Summary dated Nov. 17, 2010 in U.S. Appl. No. 12/027,698, filed Feb. 7, 2008.
Non Final Office Action dated Sep. 21, 2011 in U.S. Appl. No. 12/027,698, filed Feb. 7, 2008.
List of References cited by the Examiner dated Sep. 21, 2011 in U.S. Appl. No. 12/027,698, filed Feb. 7, 2008.
Office Action Response filed Mar. 18, 2012 in U.S. Appl. No. 121027,698, filed Feb. 7, 2008 .
Final Office Action dated Mar. 29, 2012 in U.S. Appl. No. 12/027,899, filed Feb. 7, 2008.
List of References cited by the Examiner dated Mar. 29, 2012 in U.S. Appl. No. 12/027,698, filed Feb. 7, 2008.
Final Office Action Response filed Oct. 1, 2012 in U.S. Appl. No. 12/027,698, filed Feb. 7, 2008.

* cited by examiner

SYSTEM AND METHOD FOR PROVIDING PROGRAM-RELATED CONTENT IN A MULTI-SERVICES DISTRIBUTION SYSTEM

RELATED APPLICATION(S)

This application is a continuation of U.S. patent application Ser. No. 11/756,868, entitled "System and Method For Providing Program-Related Content In A Multi-Services Distribution System," filed on Jun. 1, 2007, the entire contents of which are incorporated herein by reference.

BACKGROUND

Hybrid Fiber Coax (HFC) cable networks were originally built to deliver broadcast-quality TV signals to homes. The wide availability of such systems and the extremely wide bandwidth of these systems led to the extension of their functionality to include delivery of high-speed broadband data signals to end-users. Data over Cable System Interface Specifications (DOCSIS), a protocol developed under the leadership of Cable Television Laboratories, Inc., has been established as the major industry standard for two-way communications over HFC cable plants. Use of the DOCSIS protocol and quality-of-service management has further allowed HFC cable systems to deliver telephone service to subscribers over a packet switched network using the Internet protocol.

Large cable networks comprise distributed video and data facilities. In a typical network architecture, video is distributed to subscribers in geographically segmented markets via a dedicated headend that services multiple hubs and nodes. Regional data centers support multiple headends through separate fiber links for delivery of data and telephone services. Coordination of subscriber video services and subscriber data services (e.g., e-mail, web browsing, VoIP) is required for billing purposes and, increasingly, to provide cross-over services that use both video facilities and data facilities. For example, a video terminal device ("VTD") not only provides video services to the subscriber, but may provide the subscriber access to e-mail, web-browsing, and voice services.

Increasingly, entertainment programs delivered by program distribution networks include interactive features, which often relate to the programming content that is being shown to a user. For example, an "INFO" icon may appear on the TV screen while a regional football game is being shown, a selection of which by a remote control results in a display of scores of other regional football games being played. A similar icon may appear on the TV screen while a commercial is being shown, a selection of which results in a display of program-related content (PRC), e.g., information relating to a product or service being promoted in the commercial. To ensure a timely presentation of an interactive feature, the corresponding interactive application data may be received and stored in the user's set-top box in advance of its presentation or may be delivered via headends using VOD infrastructure.

Interactive television offers subscribers a variety of ways to interact with television programming. For example, subscribers may view web pages that complement a program, receive e-mail links to web pages related to a particular program, participate in polls, surveys, games and quizzes, order product samples, catalogs, brochures and other items, join online chats while watching a particular program, engage in e-commerce, and store upcoming programs on their personal video recorder.

These interactive services are provided in many forms. For example, RespondTV is Internet-based and requires a WebTV Plus box or a digital set-top box with a cable modem. Wink provides services through servers placed in the facilities of the local cable operators, which servers convey responses back through the Wink system.

In the past, the interactive application data was transmitted to a set-top box by time-division multiplexing the data with a transport stream via an out-of-band channel or using a VOD architecture. What would be useful is a system and method that would provide PRC to subscribers without disrupting the display of video programming, without depending on the storage resources of a VTD for displaying the PRC, without depending on a headend NDVR, and without further use of the limited video bandwidth that is available.

SUMMARY

In an embodiment of the present invention, programming content and program-related content (PRC) cues are delivered to a subscriber via an interactive multi-service distribution network. The PRC cues include interactive visual elements that may be used to create a PRC object that is selectable by a subscriber. Upon selection of a PRC object, the subscriber receives PRC through a communication service separate from the video programming delivery service, VOD service, PVR service, and NDVR service.

By way of illustration and not as a limitation, an interactive multi-service distribution network may be provided over a hybrid fiber coax (HFC) network. In this embodiment, the PRC may be transported over a high speed data (HSD) service for receipt on a desktop computer, a portable computer, a personal data assistant, or a telephone. Upstream from a hub, HSD service utilizes resources that are distinct from the resources used to provide video services. Thus, the delivery of PRC to the subscriber does not require the video services resources. Using the HSD service, the PRC may be delivered in a text format, a video format, an audio format, or a multi-media format. By way of illustration and not as a limitation, PRC may be delivered in the form of text to an e-mail account and/or delivered as an audio message to a telephone or a voice-mail storage system for later retrieval.

In an exemplary embodiment, video programming and PRC cues are delivered via an HFC multi-service network to a video terminal device (VTD) and converted to a PRC object for display on a subscriber display device. When a PRC object is selected by the subscriber, a selection signal is communicated over an upstream channel of the HFC network to a PRC server. The PRC server accesses a central datastore that relates identifying information associated with the VTD from which the selection signal was sent to identifying information of the video-subscriber. The PRC server then uses the VTD information to access the subscriber identifying formation to determine whether the subscriber is also a subscriber of high-speed data (HSD) service and, if so, the communication services to which the subscriber is entitled to receive that operate over the HSD infrastructure that could be used as a transport media for the PRC. If the subscriber is a subscriber of HSD services, the PRC server also acquires addressing information from the central datastore relating to each of the communication services available to the subscriber.

In another embodiment, if a subscriber is not a subscriber of HSD service, a message is displayed on the subscriber's VTD that to receive PRC, the subscriber is required to subscribe to the HSD services offered by the HFC multi-service network provider.

Depending on the PRC, one or more communication services offered over an HSD service may be appropriate for transport of the selected PRC. In an embodiment, the PRC cue indicates the communication service that will be used to deliver the PRC. If the PRC may be transported by multiple services, the subscriber is provided a PRC object for each available communication service and may thus select the communication service or services over which the PRC will be delivered to the subscriber.

The delivery of PRC may be supported by a number of business models. The operator of a multi-service distribution network may charge for the placement of a PRC cue in a video stream. The rate to be charged for the placement of the PRC cue may be based on the time of day, the program "rating" (a measure of the number of viewers watching a program), and the channel on which the program is carried. Additional charges may be imposed based on the number of unique selections of a PRC cue and/or on the number of PRC deliveries arising from the presentation of the PRC cue. Charges may also be imposed based on the size of the PRC as measured in bytes, words, pages, or similar measures.

In another embodiment, a VTD includes a standalone set-top box (STB); however, this is not meant as a limitation. For example, a VTD performing the communication functions of an STB may be incorporated into a cable-ready television with the security and access functions performed by an external PCMCIA type card. See, e.g., OpenCable™ Multistream CableCARD Interface Specification OC-SP-MC-IF-I02-040831.

DETAILED DESCRIPTION

Figure 1:
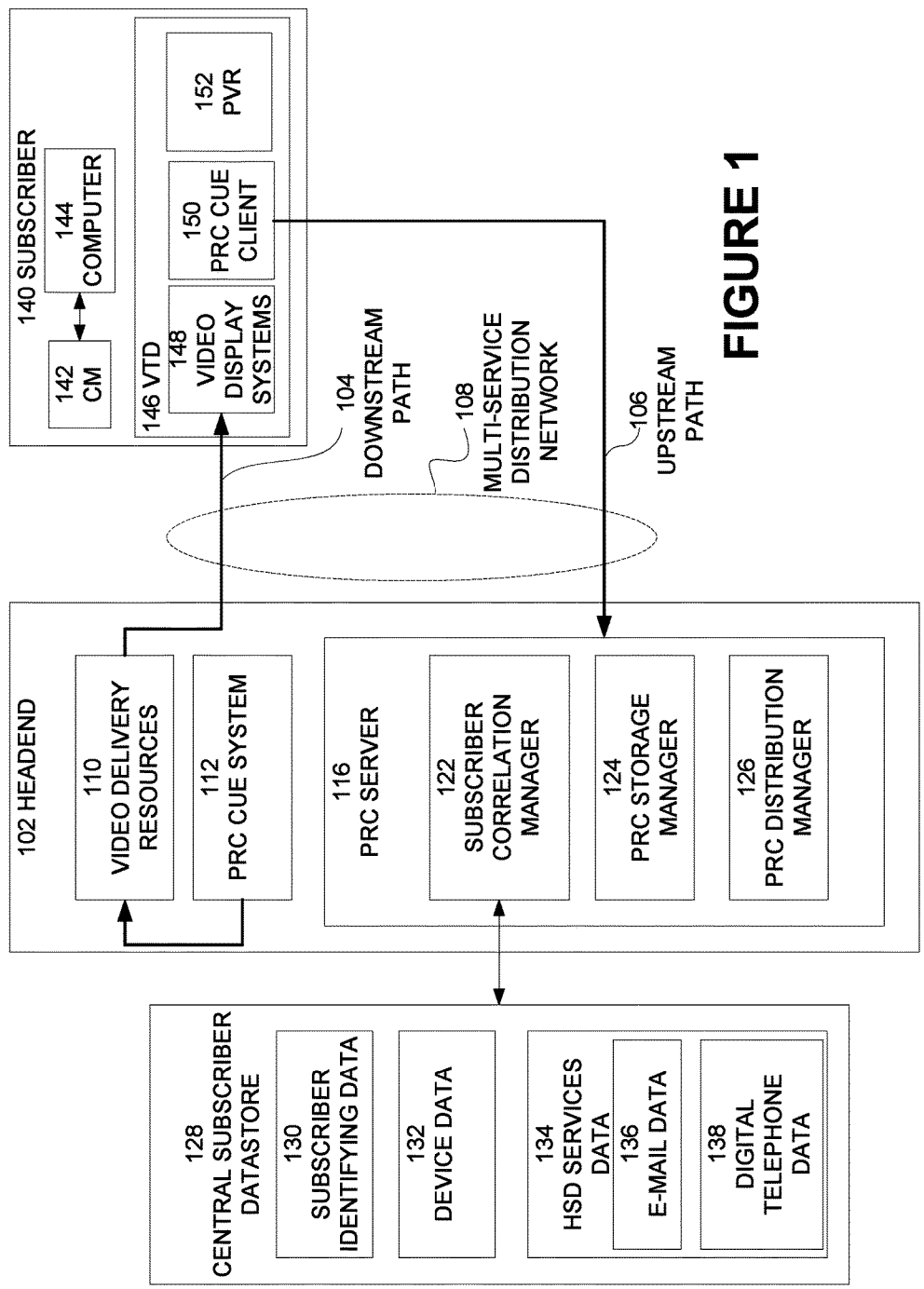
FIG. 1 illustrates a block diagram of a multi-service distribution network adapted to provide program related content.

The description of the present invention that follows utilizes a number of acronyms the definitions of which are provided below for the sake of clarity and comprehension.

| | |
|---|---|
| PRC- | Program related content. |
| PRC cue- | A flag inserted into a video stream that is associated with a particular instance of PRC. |
| PRC client- | A software application operated in a video termination device that detects a PRC cue and creates a PRC object for display on a display device. |
| PRC object- | A graphical element that is viewable on a display device and that is selectable by a subscriber. |
| HFC- | Hybrid fiber coax. |
| VOD- | Video-on-demand. |
| PVR- | Personal video recorder. |
| NDVR- | Network digital video recorder. |
| HSD- | High speed data. |
| Communications service- | A service that is provided over a HSD service, as, for example, e-mail service and digital telephone service. |
| Digital telephone service- | a voice over IP (VoIP) service provided over the HSD service infrastructure that may comprise optional feature services such as voice mail. |
| VTD- | a video termination device, such as, but not limited to, a set-top box. A VTD performing the communication functions of an STB may be incorporated into a cable-ready television with the security and access functions performed by an external PCMCIA type card. See, e.g., OpenCable ™ Multistream CableCARD Interface Specification OC-SP-MC-IF-I02-040831. |
| Video programming delivery service- | a service for delivery of video content to a subscriber over dedicated resources that connect the programming source to a hub. |
| Hub- | a component of a multi-service distribution network in which video content provided via a video programming delivery service and content provided via a HSD service are combined for delivery to a subscriber. |

In an embodiment, programming content and program-related content (PRC) cues are delivered to a video terminal device (VTD) operated by a subscriber via an interactive multi-service distribution network. A PRC client residing in the VTD is responsive to a PRC cue to produce a PRC object that is selectable by the subscriber during the viewing of a program.

A PRC cue comprises data that is broadcasted along with the video stream that notifies the VTD of an event in time and that can be used to initiate an interactive application that is associated with the video programming. Various cueing technologies have been described by industry standards bodies such as ISO, SMPTE and ATSC. For example, the ISO specifications for Digital Storage Media Control and Command (DSMCC) define means for inserting events in the video stream to achieve synchronization of the interactive data with the video content.

The selection of a PRC object allows the subscriber to receive PRC through a communications service separate from a video programming delivery service that does not require the resources of a video programming delivery service. By way of illustration and not as a limitation, an interactive multi-service distribution network may be provided over a hybrid fiber coax (HFC) network, a fiber network, and a satellite network. The PRC cues may be transported over the video services infrastructure while the PRC may be transported using the HSD infrastructure using a communications service that the subscriber is authorized to receive.

The PRC cue can include an identifier that identifies the PRC to be delivered in response to the selection of the PRC object and, optionally, information about the communications service over which the PRC will be provided to the subscriber. The program related content (PRC) may take various forms. For example, a PRC cue/object relates to an internal promotion and/or upgrades relating to products and services offered by the operator of a multi-service distribution network 108. In another example, a PRC object (generated from a PRC cue) appears during a movie trailer and provides a prompt that allows customers to request local theater show times via a communications service such as e-mail. In still another example, a PRC object appears during the playing of a music video thereby allowing the subscriber to obtain the lyrics of the song being performed. In yet another example, a PRC object appears during a news broadcast to provide a subscriber with more information about a story or a person depicted in a story. In another example, a video display displays a PRC object during an advertisement allowing the subscriber to receive printable coupons or sign up for sample merchandise. In yet another example, selection of the PRC object provides a subscriber with contact information (for example, a telephone number, a URL, or an e-mail address) regarding a product or service obviating the need to remember or write down the information during the viewing of the related program. In still another example, during a sport broadcast, a PRC object provides team and player statistics via text messaging to a cell phone or instant messaging service.

FIG. 1 illustrates a block diagram of a multi-service distribution network 108 of an embodiment adapted to provide PRC. Headend 102 includes video delivery resources 110. By way of illustration and not as a limitation, video delivery resources 110 may include devices for distribution of broadcast programming, video-on-demand (VOD) programming, pay-per-view programming and other video service offerings. PRC cue system 112 injects selected PRC cues into the program content. Without limiting the foregoing, PRC cues may be injected into the video content by adding additional content to the video stream, altering the video stream, and/or by preempting a portion of the video stream.

Central subscriber datastore 128 includes subscriber identifying data 130, device data 132, and HSD services data 134. HSD services data 134 further includes e-mail data 136 and digital telephone data 138. Generally, central subscriber datastore 128 includes data that are unique to subscriber 140. For example, device data 132 can be a unique identifier for each device connected to the multi-service distribution network 108. Knowledge of the unique identifier associated with any such device will provide headend 102 (as described below) access to the subscriber identifying data 130 and the HSD services data 134.

Video content containing PRC cues may be sent to video termination device (VTD) 146 associated with subscriber 140 via a downstream path 104. While the VTD 146 is illustrated as a standalone device, this is not meant as a limitation. For example, a VTD 146 performing the communication functions of a set-top box may be incorporated into a cable-ready television with the security and access functions performed by an external PCMCIA type card. See, e.g., OpenCable™ Multistream CableCARD Interface Specification OC-SP-MC-IF-I02-040831.

VTD 146 can possess a unique VTD identifier that is associated with subscriber 140. By way of illustration and not as a limitation, the unique VTD identifier may be a MAC address of the VTD or an identifier assigned by the operator of the multi-service distribution network 108. Central subscriber datastore 128 stores the unique VTD identifier as device data 132.

VTD 146 can interact with visual cues by execution of PRC client 150. PRC client 150 may include software that detects a PRC cue, creates a PRC object viewable by subscriber 140, and renders the PRC object selectable by a subscriber. In an embodiment, a PRC cue interacts with PRC client 150 in accordance with configuration data of the PRC client 150. Configuration data may be used to establish a PRC object display interval, a PRC object opacity, a PRC object size, and/or a PRC object display location. The configuration of the PRC client 150 may be under the control of the operator of a multi-service distribution network 108. The PRC client 150 may be configured to receive configuration data from the subscriber 140, either through a local graphical user interface (not illustrated) or through a web interface operated by the operator of a multi-service distribution network 108. The configuration data may also include a disable-PRC-objects function, which, when selected by the subscriber, disables the PRC client 150 so as not to process PRC cues or produce PRC objects.

A PRC cue may be present when a program is broadcast or delivered for viewing. If a subscriber utilizes a NDVR or PDR, the viewing of a program may be sufficiently delayed from its scheduled viewing time that the PRC is no longer available for delivery to the subscriber. In such a circumstance, a PRC cue may include "view-by" data that is used by the PRC client 150 to determine whether to display a PRC object. By way of illustration and not as a limitation, "view-by" data may take the form of an expiration date and time, an elapsed time since the program was first scheduled for viewing by the subscriber, or a link to the PRC distribution manager 126. In this latter example, the PRC distribution manager 126 contains a status identifier indicative of whether the PRC is currently available for delivery. Based on the status identifier, the PRC client 150 will either display the PRC object or ignore the PRC cue.

An HSD subscriber may be entitled to receive e-mail via an e-mail service provided by the operator of the multi-service distribution network 108 or may utilize a mail server operated by a third-party. In either case, an e-mail address associated with the subscriber 140 is stored as e-mail data 136 as a subset of HSD services data 134 within central subscriber datastore 128. The e-mail address for receipt of PRC may be selected by subscriber 140 and stored as e-mail data 136.

Subscriber 140 may also be entitled to receive digital telephone service over the HSD service provided by the operator of the multi-service distribution network 108. The telephone number of the subscriber 140 can be stored as digital telephone data 138. Digital telephone data 138 also may include a voice mail status identifier that indicates that the subscriber 140 has activated a voice-mail account.

Depending on the PRC, one or more communications services may be appropriate for transport of the selected PRC. For example, the PRC cue indicates the communication service that will be used to transport the PRC. The PRC cue may limit the transport to e-mail service because of the media or size of the PRC or because of the action a subscriber is to take with respect to the PRC. Thus, text that includes content to be printed may only be available by e-mail. PRC may be available as an audio file. Depending on the size of the file, the audio file may be delivered using e-mail service or digital telephone service. Further, the PRC may be attached or pasted into an e-mail or the e-mail may contain a link to a server where a file comprising PRC may be downloaded.

If the PRC may be transported by multiple communication services, subscriber 140 is provided with a PRC cue/object for each available communication service and may thus select the communication service or services over which the PRC will be delivered.

Regardless of the communications service that is used to transport the PRC, the video programming delivery service of the multi-service distribution network 108 is not involved in the transport or storage of the PRC. Thus, PRC may be provided to subscriber 140 without consuming network resources needed to support VOD services, broadcast services, NDVR services, and PDR services.

PRC client 150 receives a PRC object selection signal from a remote control device operated by the subscriber 140 and sends a PRC request signal to PRC server 116 via upstream path 106. The PRC request signal may include: a PRC identifier associated with the PRC requested by subscriber 140, a communication service by which the PRC will be transported to subscriber 140, and/or the VTD identifier of the VTD 146 from which the PRC signal originated.

The PRC server 116 includes a subscriber correlation manager 122, a PRC storage manager 124, and a PRC distribution manager 126. Subscriber correlation manager 122 accesses the central subscriber datastore 128 to access device data 132. Using the VTD identifier included in the PRC signal, the subscriber correlation manager 122 accesses subscriber identifying data 130 to acquire subscriber identifying data associated with subscriber 140. By way of illustration and not as a limitation, subscriber identifying information can include: a subscriber account number, a subscriber name, and/or a subscriber address. Subscriber correlation manager 122 uses the subscriber identifying information associated with subscriber 140 to locate HSD services data 134 associated with subscriber 140.

The subscriber correlation manager 122 can also access the central subscriber datastore 128 to access device data 130. Using the VTD identifier included in the PRC signal, the subscriber correlation manager 122 finds a device identifier associated with a cable modem 142 associated with subscriber 140. The device identifier associated with the cable modem 142 is then used to locate HSD services data 134 associated with subscriber 140.

If e-mail is selected as the communication service for delivery of the PRC, the subscriber correlation manager 122 uses the HSD services data 134 to obtain the e-mail address of the subscriber from e-mail data 136. The subscriber correlation manager 122 passes the e-mail address to PRC distribution manager 126. The PRC distribution manager 126 retrieves the PRC from PRC storage manager 124 and either pastes the PRC into an e-mail or attaches the PRC to an e-mail addressed to the e-mail address obtained from e-mail data 136.

If digital telephone service is selected as the communication service for delivery of the PRC, the subscriber correlation manager 122 uses the HSD services data 134 to obtain the subscriber telephone number. In one example, the PRC is delivered directly to the subscriber following the selection of the PRC object by phone or text message. In another example, the subscriber correlation manager checks the digital telephone data 138 for a voice mail status identifier indicating that the subscriber 140 has activated a voice mail account. If a voice mail account has been activated, the PRC is delivered directly to voice-mail without ringing the subscriber's telephone.

Subscriber 140 may configure PRC client 150 to establish a preference on how PRC is to be delivered to a telephone. The preference information is conveyed in the PRC selection signal sent by PRC client 150 and is used by PRC distribution manager 126 to determine the mechanism by which the PRC is delivered to subscriber 140.

The operator of the multi-service distribution network 108 may provide PRC delivery services to promote its own services or to promote products and services of third parties for a fee. In the case of the latter, a fee structure model may include fees related to the transport of a PRC cue, "clicks" on a PRC object generated from the PRC cue by subscribers, and/or purchases made in response to the presentation of a PRC object. The fee structure may be cumulative such that the operator of the multi-service distribution network 108 may collect the transport fee, the transport fee plus the "click" fee, and/or the transport fee plus the click fee plus the purchase fee depending on the behavior of the subscriber.

Figure 2:
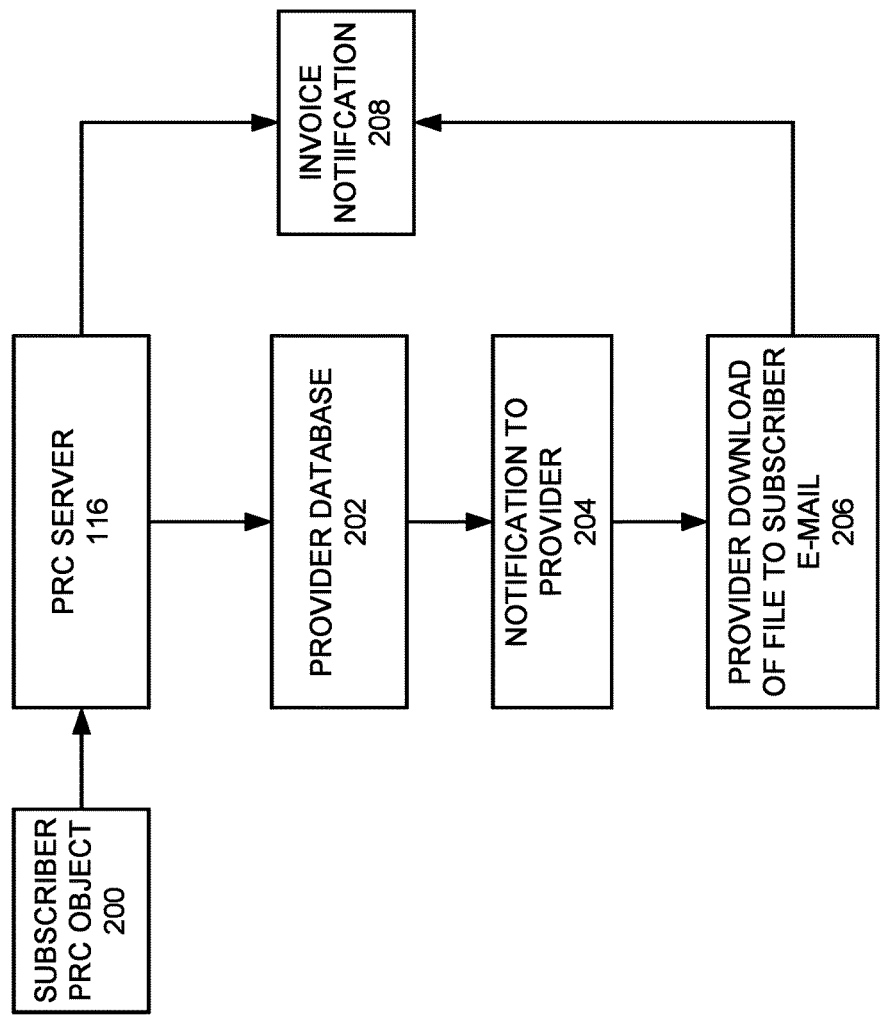
FIG. 2 illustrates a method of purchasing employing a PRC.

FIG. 2 illustrates a method of employing a PRC in purchasing. As is well known, there are a number of businesses now offering legal downloads of media of various type. One of the most ubiquitous of these is iTunes® offered by Apple Computer as an adjunct service to those purchasing its iPod® product. Other similar services are also available. In this illustration, a PRC client receives a PRC cue and creates a PRC object that may be displayed during a music video. If the user desires to purchase a download of the song being played, the user selects the PRC object in step 200. The PRC manager receives the PRC cue notification at the PRC server 116. The PRC server 116 access a database of providers in step 202 who have contracted with the owner of the media delivery service. This database will include the identity and communication links to the provider together with salient contract information such as fees for a "click through" to the service provider and/or a fee to be charged for each download provided by the service provider to the subscriber.

PRC server 116 sends notification of the selection of the PRC object by the subscriber to the service provider in step 204. The service provider in turn provides the download of the selected tune to the subscriber in step 206. Depending on the contract terms, the service provider can be invoiced based on every request in step 208 or receives notification from the service provider that a download was provided to a subscriber, which will then result in an invoice on a periodic basis. Of course, music files are not the only types of download files envisioned. As video downloads become more prevalent, it is envisioned that video files will also become part of such distribution and commerce. Other types of graphic files known to those in the art will also be the subject of such selection and download, including, by way of illustration and not as limitation, photographs, screen savers, clip art, DVD and CD cover graphics, architectural drawings, plans for hobbies and crafts, sewing and knitting patterns, and the like.

Download of ring tones is also a popular and increasingly valuable service offered by cell phone companies. Currently, telephone service providers such a Cingular and Verizon offer specific downloads of ring tones for a fee. Ring tones can also be created from downloads from the Internet.

Figure 3:
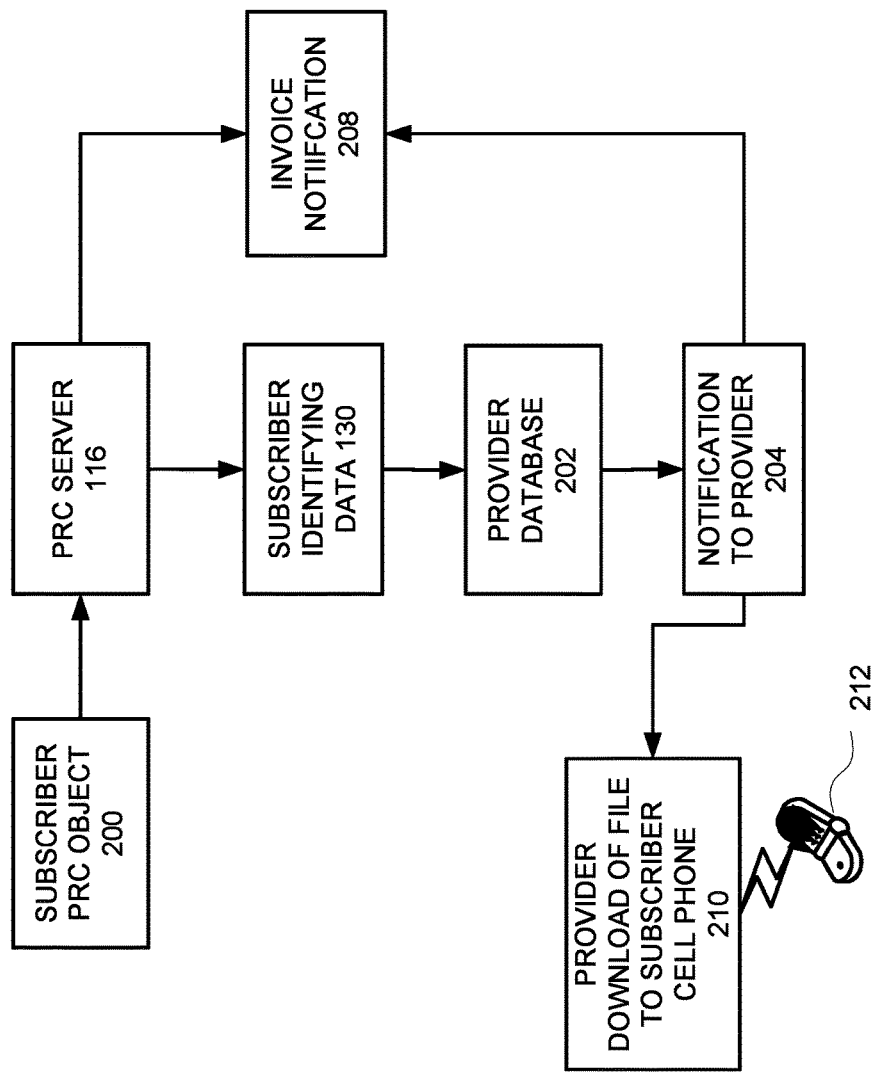
FIG. 3 illustrates a method of purchasing a ring-tone.

Referring now to FIG. 3 illustrates a method of purchasing. In this instance, a subscriber may be viewing a music program such as that offered on MTV®, or CMT® over the video network. Upon receipt of a PRC cue, the PRC client creates a PRC object that can be selected by the subscriber in step 200. Upon selection of the PRC object, notification will be provided to the PRC server 116. The PRC server 116 will access the subscriber identifying data 130 to determine the cell phone service provider of the subscriber and cell phone number of the subscriber. Thereafter, the provider database will be accessed in step 202, which includes communication information for the cell phone provider. The PRC server 116 sends notification to the cell phone provider in step 204 to provide the desired ring tone to the subscriber. Thereafter, the cell phone provider 212 downloads the ring tone in step 210. An invoice for the PRC cue/object is then periodically sent to the cell phone provider in step 208.

Figure 4:
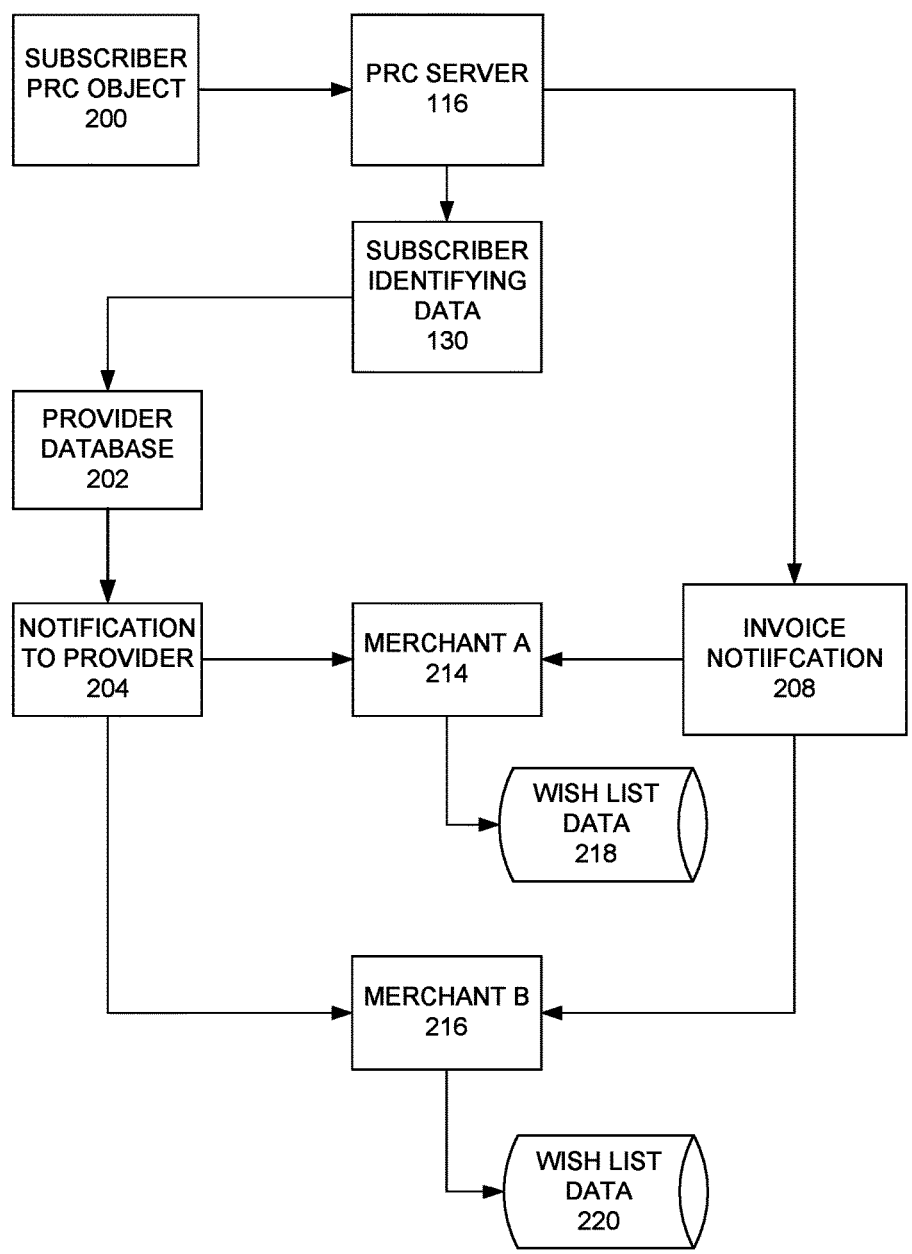
FIG. 4 illustrates a wish-list establishment method.

FIG. 4 illustrates a method of establishing a "wish list." In this illustration, a PRC client receives a PRC cue and creates a PRC object that may be displayed during a commercial or during actual program viewing. If the user desires to place the product or service on a wish list, the subscriber selects the PRC object in step 200. The PRC manager receives the PRC cue/object selection notification at the PRC server 116. The PRC server 116 will access the subscriber identifying data 130 to determine the identity and mailing information of the subscriber and whether the subscriber has authorized such data to be made available to merchants/service providers. The PRC server 116 accesses a database of providers in step 202, which includes merchants offering goods and services to subscribers of the video service and who have contracted with the owner of the video delivery service. This database will comprise the identity and communication links to the provider/merchant together with salient contract information such as fees for a "click through" to the merchant/service provider, or fee to be charged for each item placed on the wish list of the subscriber.

Notification step 204 of the wish item is then made to the merchants 214, 216 together with salient contact information of the subscriber. Thereafter the merchant 214, 216 can set up a wish list for the subscriber in a wish list database 218, 220 which can be access by those interested in purchasing a gift for the subscriber.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A video termination device (VTD) for facilitating delivery of program related content (PRC) to a subscriber device comprising:
   a processor configured with processor executable instructions to cause the VTD to perform operations comprising:
      receiving a video programming stream from a video delivery resource device over a multi-service distribution network, wherein the video programming stream includes a PRC cue that comprises a communication service identifier identifying a communication service for transport of the PRC and view-by data comprising a link to a PRC server device storing a status identifier, wherein the status identifier is indicative of whether the PRC is available for delivery to the subscriber device;
      acquiring the view-by data from the PRC cue;
      determining from the view-by data if the PRC has expired;
      disregarding the PRC cue in response to determining that the PRC has expired;
      displaying a PRC object on a display device based on the PRC cue to indicate-an availability of the PRC in response to determining that the PRC has not expired;
      receiving a user input selecting the displayed PRC object;
      sending a PRC request signal including the communication service identifier identifying the communication service to the PRC server device to initiate transport of the PRC contained in the PRC cue via the communicate service to the subscriber device in response to receiving the user input selecting the displayed PRC object;
      receiving configuration data that comprises a PRC object display interval, a PRC object opacity, a PRC object size, a PRC object display location, a disable-PRC-objects function or any combination thereof;
      displaying the PRC object based on the received configuration data;
      determining whether the disable PRC object function is selected; and
      ceasing to process PRC cues and generate PRC objects in response to determining that the disable PRC object function is selected.

2. The VTD of claim 1, wherein the communication service comprises an e-mail service, a text-messaging service, a cellular telephone service, a digital telephone service, or any combination thereof.

3. The VTD of claim 1, wherein the VTD comprises a set-top box, a cable-ready television, a personal computer, or any combination thereof.

4. A system for delivering program related content (PRC) to a subscriber device comprising:
   a video termination device (VTD); and
   a PRC server device;
   wherein the VTD comprising a processor configured with processor executable instructions to cause the VTD to perform operations comprising:
      receiving a video programming stream from a video delivery resource device over a multi-service distribution network, wherein the video programming stream includes a PRC cue that comprises a communication service identifier identifying a communication service for transport of the PRC and view-by data comprising a link to the PRC server device, the PRC server device storing a status identifier, wherein the status identifier is indicative of whether the PRC is available for delivery to the subscriber device;
      acquiring the view-by data from the PRC cue;
      determining from the view-by data if the PRC has expired;
      disregarding the PRC cue in response to determining that the PRC has expired;
      displaying a PRC object on a display device based on the PRC cue to indicate-an availability of the PRC in response to determining that the PRC has not expired;
      receiving a user input selecting the displayed PRC object; and
      sending a PRC request signal including the communication service identifier identifying the communication service to the PRC server device to initiate transport of the PRC contained in the PRC cue via the communicate service to the subscriber device in response to receiving the user input selecting the displayed PRC object;
      receiving configuration data that comprises a PRC object display interval, a PRC object opacity, a PRC object size, a PRC object display location, a disable-PRC-objects function or any combination thereof;
      displaying, by the processor, the PRC object based on the received configuration data;
      determining, by the processor, whether the disable PRC object function is selected; and
      ceasing, by the processor, to process PRC cues and generate PRC objects in response to determining that the disable PRC object function is selected; and
   wherein the PRC server device comprises a processor configured with processor executable instructions to cause the PRC server device to perform operations comprising:

receiving the PRC request signal, wherein the PRC request signal further comprises an identifier of the VTD;

obtaining subscriber identifying data related to the communication service from a datastore based on the identifier of the VTD; and transporting the PRC via the communication service to the subscriber device based on the subscriber identifying data.

5. The system of claim 4, further comprising:

a PRC cue injection device comprising a processor configured with processor executable instructions to cause the PRC cue injection device to inject the PRC cue into the video programming stream.

6. A method for delivering program related content (PRC) to a subscriber device, the method comprising:

receiving, by a processor of a video termination device (VTD), a video programming stream from a video delivery resource device over a multi-service distribution network, wherein the video programming stream includes a PRC cue that comprises a communication service identifier identifying a communication service for transport of the PRC and view-by data comprising a link to a PRC server device storing a status identifier, wherein the status identifier is indicative of whether the PRC is available for delivery to the subscriber device;

acquiring, by the processor, the view-by data from the PRC cue;

determining, by the processor, from the view-by data if the PRC has expired;

disregarding, by the processor, the PRC cue in response to determining that the PRC has expired;

displaying, by the processor, a PRC object on a display device based on the PRC cue to indicate-an availability of the PRC in response to determining that the PRC has not expired;

receiving, by the processor, a user input selecting the displayed PRC object;

sending, by the processor, a PRC request signal including the communication service identifier identifying the communication service to the PRC server device to initiate transport of the PRC contained in the PRC cue via the communication service to the subscriber device in response to receiving the user input selecting the displayed PRC object;

receiving configuration data that comprises a PRC object display interval, a PRC object opacity, a PRC object size, a PRC object display location, a disable-PRC-objects function or any combination thereof;

displaying, by the processor, the PRC object based on the received configuration data;

determining, by the processor, whether the disable PRC object function is selected; and ceasing, by the processor, to process PRC cues and generate PRC objects in response to determining that the disable PRC object function is selected.

7. The method of claim 6, wherein the communication service comprises an e-mail service, a text-messaging service, a cellular telephone service, a digital telephone service, or any combination thereof.

8. The method of claim 6, wherein the VTD comprises a set-top box, a cable-ready television, a personal computer, or any combination thereof.

* * * * *